United States Patent [19]

Kuroda et al.

[11] Patent Number: 5,302,969
[45] Date of Patent: Apr. 12, 1994

[54] DOCUMENT FORMAT SETTING METHOD AND APPARATUS

[75] Inventors: Masayoshi Kuroda, Yokohama; Yasumasa Matsuda, Tokyo; Hiroyuki Kumai, Yokohama; Yasuhiko Kasai, Fujisawa; Kiyoshi Masuda, Omiya; Akihiro Kaneko, Hitachi; Junichiro Takeyama, Omiya, all of Japan

[73] Assignee: Hitachi, Ltd., Tokyo, Japan

[21] Appl. No.: 757,612

[22] Filed: Sep. 11, 1991

[30] Foreign Application Priority Data

Sep. 12, 1990 [JP] Japan .................................. 2-239838
Sep. 14, 1990 [JP] Japan .................................. 2-242395

[51] Int. Cl.⁵ .............................................. G09G 3/02
[52] U.S. Cl. .................................... 345/168; 395/145
[58] Field of Search .................. 340/710, 711, 721; 345/168; 395/145-149

[56] References Cited

U.S. PATENT DOCUMENTS 4,429,372 1/1984 Berry et al. ................... 395/148 X
4,803,474 2/1989 Kulp .............................. 340/711 X
4,862,390 8/1989 Weiner ......................... 340/710 X

OTHER PUBLICATIONS

Print Shop Reference Manual, Broderbund Software, 1984.
Mano, M. M., "Computer System Architecture," Prentice Hall, Inc., Englewood Cliffs, N.J., 1982, pp. 264-266.

Primary Examiner—Ulysses Weldon
Attorney, Agent, or Firm—Antonelli, Terry, Stout & Kraus

[57] ABSTRACT

In a document processing apparatus wherein a format of a document or the like is set, a plurality of possible format patterns are simultaneously displayed, and a selection of a desirable format pattern among said format patterns is made so as to perform a format setting operation. Displays of the format patterns are subdivided into a plurality of screens based on a purpose or usage of a document to be formed. After selecting or designating the purpose or usage of the document, the above-described format pattern is displayed. The document format setting operation which was cumbersome in prior art can be readily performed by selecting a desirable format sample from the format samples which have been categorized based upon the usage thereof, and also by adding an item capable of freely setting a format into the format samples.

3 Claims, 9 Drawing Sheets

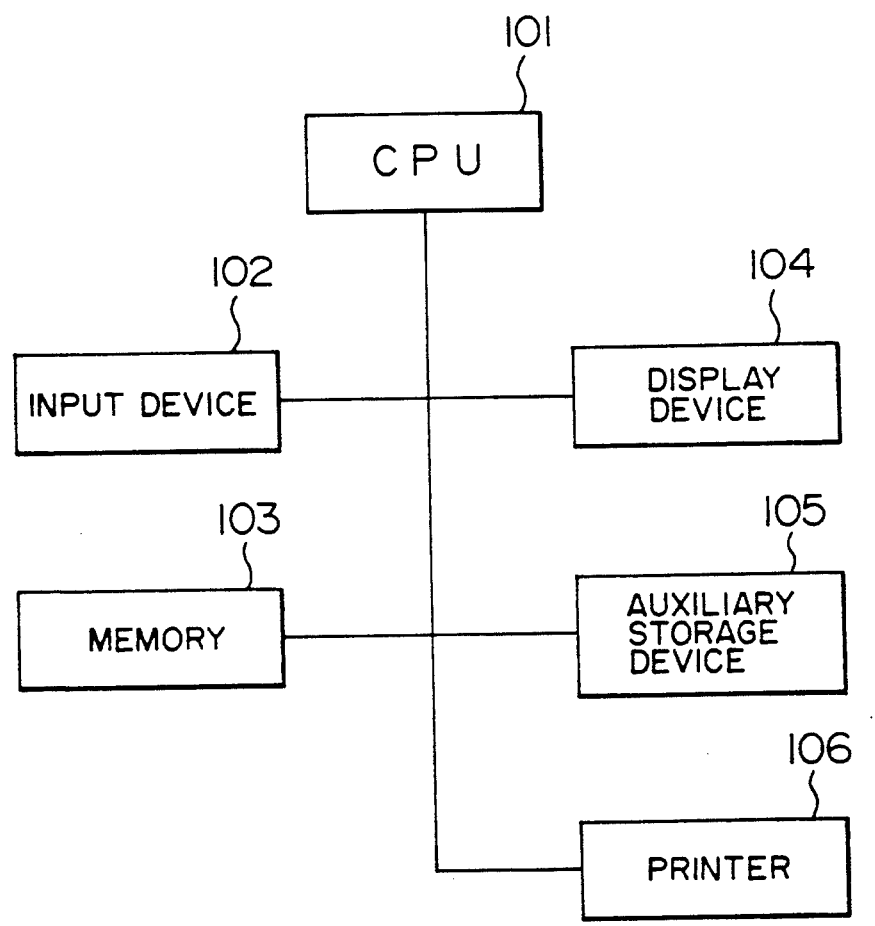
F I G. 1

FIG. 2

| A4, LONGER SIDE VERTICAL, HORIZONTAL WRITING | A4, LONGER SIDE HORIZONTAL, HORIZONTAL WRITING | A5, LONGER SIDE VERTICAL, HORIZONTAL WRITING |
|---|---|---|
| B4, LONGER SIDE VERTICAL, HORIZONTAL WRITING | B5, LONGER SIDE VERTICAL, HORIZONTAL WRITING | B5, LONGER SIDE VERTICAL, VERTICAL WRITING |
| ---------- | ---------- | ---------- |

201

SUCCEEDING SCREEN ⇩   PRECEDING SCREEN ⇧

| POST CARD, LONGER SIDE VETICAL, HORIZONTAL WRITING | POST CARD, PUTTING LONGER SIDE HOLIZONTALLY, HORIZONTAL WRITING | POST CARD, ADDRESS |
|---|---|---|
| POST CARD, LONGER SIDE VERTICAL, VERTICAL WRITING | POST CARD, LONGER SIDE VERTICAL, HORIZONTAL WRITING | POST CARD, NEW YEAR GREETING CARD |
| ---------- | ---------- | ---------- |

202

SUCCEEDING SCREEN ⇩   PRECEDING SCREEN ⇧

| A4, LONGER SIDE VERTICAL, HORIZONTAL WRITING | A4, LONGER SIDE VERTICAL, VERTICAL WRITING | B5, LONGER SIDE VERTICAL, HORIZONTAL WRITING |
|---|---|---|
| STATIONERY FORMAT 1 | STATIONERY FORMAT 2 | B5, LONGER SIDE VERTICAL, VERTICAL WRITING |
| ---------- | ---------- | ---------- |

203

| REPORT | POST CARD | LETTER |
|--------|-----------|--------|
| -------- | -------- | -------- |
| -------- | -------- | -------- |

PAPER SIZE             A3  [A4]  B4  B5

PAPER DIRECTION        [VERTICAL LONG]   HORIZONTAL LONG

PRINTING DIRECTION     VERTICAL  [HORIZONTAL]

MARGIN                 ( 10 ) mm

LINE NUMBER / 1 PAGE   ( 40 ) LINES

COLUMN NUMBER / 1 PAGE ( 80 ) COLUMNS

DOCUMENT FORMAT SETTING METHOD AND APPARATUS

BACKGROUND OF THE INVENTION

The present invention generally relates to a document processing apparatus having both an editing function and a display function for a document and the like. More specifically, the present invention is directed to a document format setting method capable of readily recognizing a sequential process for setting a format or the like of the document to be formed, and also of easily setting this format.

In, for instance, a conventional wordprocessor, when a document is newly formed with a desirable format, a format setting operation of this document is carried out in the following method. That is, as a first setting method, for example, a format setting menu is displayed which offers such format setting items as size of paper, direction of paper, direction of printing, size of characters, and column indexing Then, the chosen format setting items are confirmed, and when the desired format at setting items are not offered a user selects or newly enters the desirable format setting item by way of the input device such as the keyboard for the setting operation.

As a second conventional setting method, several sorts of standard format patterns are previously prepared which are so-called "style sheet" and are used frequently, and also are displayed in a visible form. Then, the most proper format pattern is selected so as to be set.

The above-described former setting method is complicated when the desired format is not offered and the desired format setting items must be selected or newly inputted thereby increasing the total number of the setting operations. It is difficult for a beginner to judge whether or not the selected format setting item adheres to the desired format based upon only the information about this format setting item and such formatting can not be confirmed without actually printing the format. Further complicating the formatting process, there are some desirable formats that cannot be set with only one setting operation.

As to the latter setting method, the total number of available prepared formats can be so great that it is not possible to display all of these available formats on the same screen. Thus, the screen must be changed to display the available formats and the desirable format cannot be easily selected.

Then, if only the frequently utilized format patterns in frequent are displayed, quite often desired format is not present in the selected formats.

SUMMARY OF THE INVENTION

An object of the present invention is to provide a document format setting method and an apparatus capable of readily setting a format.

To achieve the above-described object, the present invention is characterized in that:

a basic menu is displayed which contains, for instance, a plurality of classified menu items which have been classified on the basis of an object to form a document, or usage thereof to be produced;

when a designation is made of any one of menu items among this basic menu, a format selecting menu is displayed which involves a plurality of format selecting menu items which corresponds to the designated menu item and in which format setting items have been previously determined; and, a format setting operation of the document is easily performed by selecting a desirable format selecting menu item among the displayed menu.

Also, in accordance with the present invention, it is possible to store a plurality of information about format setting items of a document such as size of paper, direction of paper, printing direction, size of characters and column indexing, and also information about sorts of document functions by which this format is utilized;

a basic menu is categorized by, for instance, a purpose of the document and usage thereof based upon this information, so as to be displayed;

when a desirable menu item is selected from the displayed basic menu, a plurality of format selecting menu items which are suitable for the selected menu based upon the above-described format setting item information are simultaneously displayed, or are subdivided to be displayed;

a document format can be set by selecting a desirable menu from the format selecting menu.

BRIEF DESCRIPTION OF THE DRAWINGS

FIG. 1 is a schematic block diagram for showing a document processing apparatus according to a preferred embodiment of the present invention;

FIG. 2 illustrates an example of displays of format selecting screens;

DESCRIPTION OF PREFERRED EMBODIMENTS

Figures 3, 4:
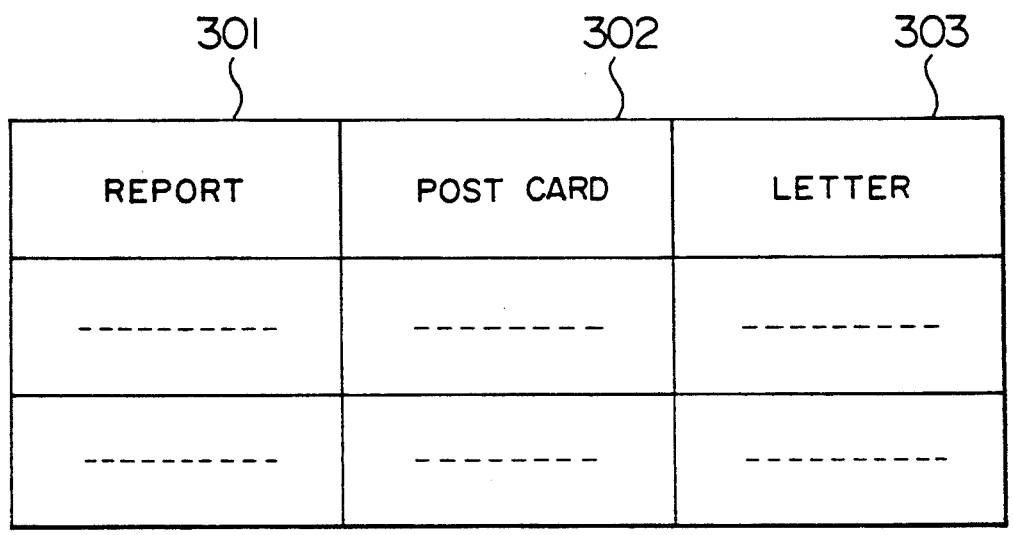
FIG. 3 illustrates an example of selecting screens for a purpose or a use of a document.
FIG. 4 illustrates an example of a screen for setting format items.

Referring now to the drawings, a document processing apparatus according to a preferred embodiment of the present invention will be described. FIG. 1 represents an example of a construction of a document processing apparatus for editing and displaying documents and the like, according to this preferred embodiment.

The document processing apparatus shown in FIG. 1 is arranged by: a central processing unit (CPU) 101 for controlling an overall system; an input device 102 such as a keyboard for entering characters, control codes and the like; a memory 103 for storing therein information such as a program and document data; a display device 104 for displaying results of entries and processes; an auxiliary storage device 105 such as a magnetic disk for storing or reading either the program or document data; and, a printer 106 for printing the processed results and the like.

Figure 5:
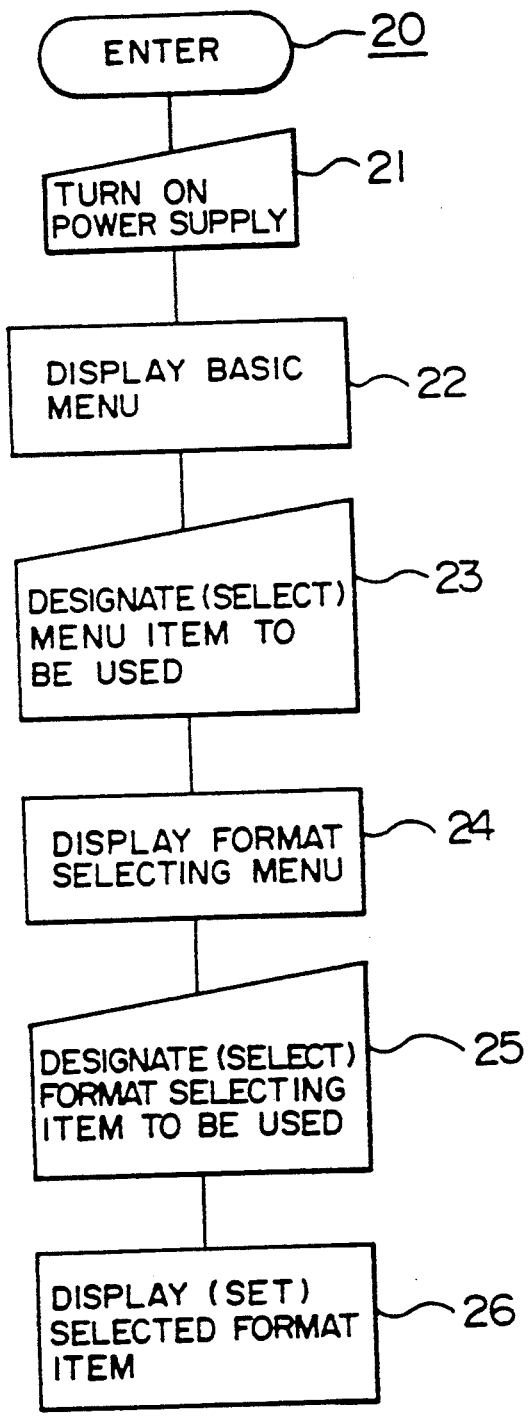
FIG. 5 is a flow chart for explaining an operation of the document processing apparatus shown in FIG. 1 according to the present invention.

Subsequently, a format setting method of the document processing apparatus will now be explained based upon a flow chart shown in FIG. 5. First, at step 21 shown in FIG. 5, when a power supply is turned on, then a basic menu as represented in FIG. 3 is displayed at step 22. The basic menu contains a plurality of basic menu items such as "general document", "report", "post card", and "letter", which are categorized into purpose and usage, and is displayed in a 3×3 matrix arrangement along longitudinal and transverse directions.

At step 23, when a designation is made of a desired menu item among the menu items contained in this basic menu, as shown in FIG. 2, a format selecting menu, namely a plurality of format samples are represented, and also a plurality of format selecting menu items in which each of format setting items has been previously determined, are displayed in 3×3 matrix arrangement. In case that all of the format patterns cannot be displayed within a single screen as shown in this example, the format selecting menu items are subdivided into a plurality of screens, for instance, three screens, and then a desirable screen may be displayed by operating a screen changing key for a preceding screen and a succeeding screen.

That is to say, assuming now that the menu item of "report 301" is selected from the basic menu as shown in FIG. 3, the format selecting menu is displayed as shown in 201 of FIG. 2. Similarly, when the menu item of "post card 302" is selected, the format selecting menu of 202 shown in FIG. 2 is displayed. When the menu item of "letter 303" is selected, the format selecting menu of 203 shown in FIG. 2 is displayed.

When a desirable format selecting item is selected at the next step 25, a display (setting) corresponding to this selected item is made at the subsequent step 26.

As a consequence, since a user first designates the purpose or usage of the document, only the desirable format selecting menu item may be displayed, whereby the desirable format sample may be readily obtained.

There are some cases that the above-listed format selecting menu items cannot cover some documents formed by users. To this end, for instance, a "free format setting" menu as the format selecting menu item may be provided in the format selecting menu in combination with the format selecting item for the fixed format in which the respective format setting items have been previously determined. Then, when this menu item is selected, for example as shown in FIG. 4, the format setting screen normally employed in the document processing apparatus is displayed so that each of the format setting items may be freely set.

Also, even if the purpose or usage of the document is different, since it may be conceived that the same format selecting menu item (format pattern) is employed, the same format pattern may be selected from the different menu items.

When applied to, for example, a Japanese word processor, the operation of the document processing apparatus according to the preferred embodiment of the present invention may be further improved if items set from the selected format selecting menu item may involve, for instance, that the condition of the input mode is set to a specific condition when an "English document" is selected, i.e., this normal input mode of "HIRAGANA characters" is set to "alphanumeric character", other than the physical values such as the numerical values or formats, e.g., paper sizes, margin values and printing directions.

In accordance with the above-described preferred embodiment of the present invention, since the format samples can be selected from the categorized items as to, for example, the purpose of document and the usage thereof, the format setting operations which were very cumbersome in the conventional document processing apparatuses can be easily performed. Also, since the free format setting menu item capable of freely setting the format setting items and the like is mixed with the format samples, and the free format setting menu item is available when no desirable format sample is found out from the format samples, the desirable format setting operations may be achieved.

Figure 6:
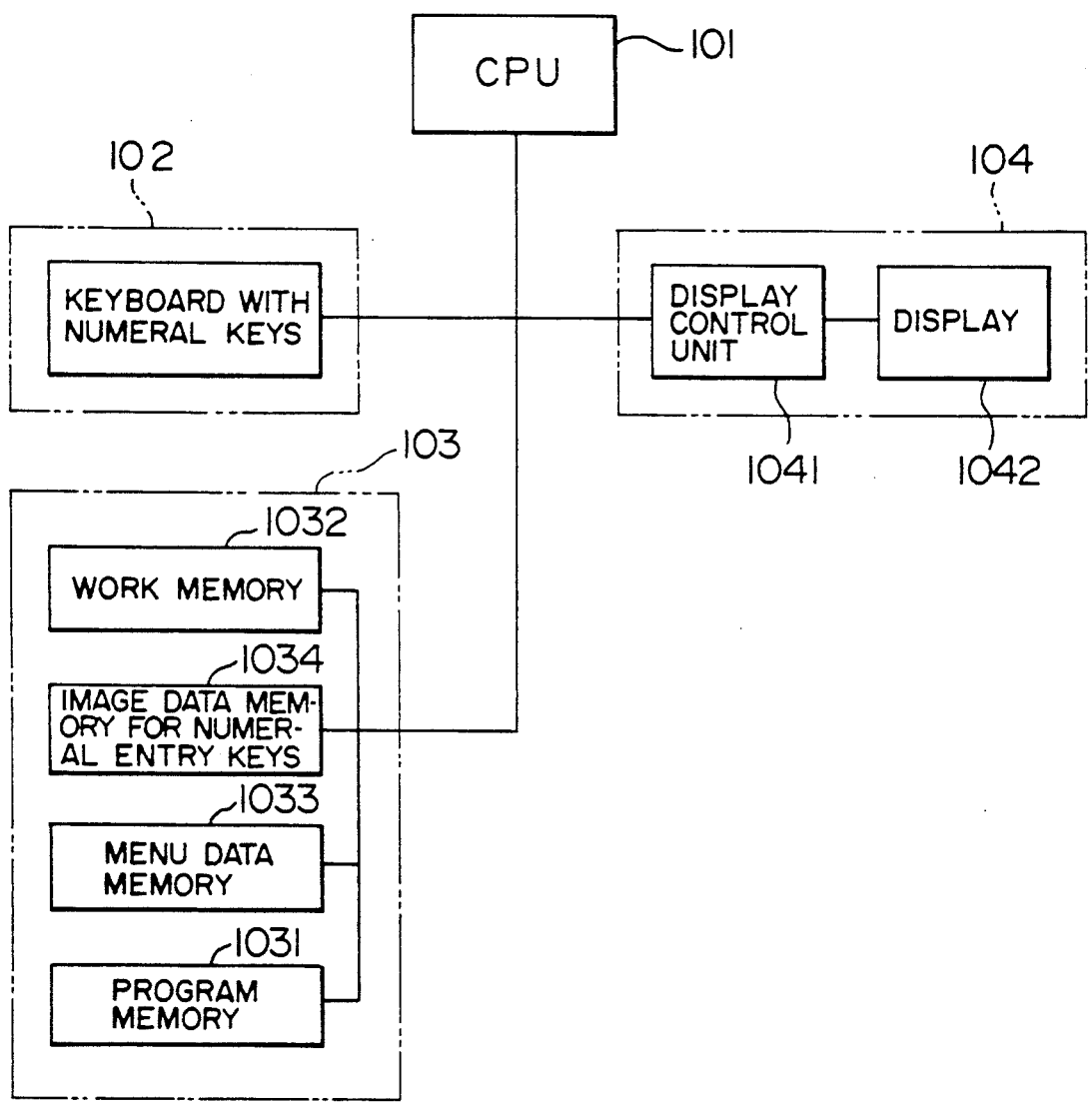
FIG. 6 is a schematic block diagram of a document processing apparatus according to another preferred embodiment of the present invention.

FIG. 6 is a schematic block diagram for showing an overall system of a document processing apparatus according to another preferred embodiment of the present invention, by which each menu item of a basic menu may be readily selected. In other words, even when a user is a beginner, he can readily select the basic menu by observing the contents of the displays. In this figure, the same reference numerals will be employed for denoting the same parts shown in FIG. 1, and detailed descriptions thereof are omitted. A memory 103 is constructed of: a program memory 1031 for storing therein various programs executed by the CPU 101; a work memory 1032 for temporarily storing therein data which are produced during the execution stages of the programs; a menu data memory 1033 for storing menu data which is read out based upon the program memory 1031 when a power supply is turned on, and is displayed via a display control unit 1041 of the display device 104 on a display 1042; and an image memory 1034 for numeral entry keys for storing therein guidance data, for example, image data on numeral entry keys which are selected when the menu data are displayed. It should be noted that the memory 1032 is arranged by RAM, whereas the memories 1031, 1033 and 1034 are arranged by ROMs. The menu data corresponds to such a data indicative of the basic menu constructed of a plurality of menu items when the power supply is turned on. This basic menu is categorized into, for example, purposes of use and usages. The input device 102 is arranged by a keyboard equipped with numeral entry keys, which is used to select the above-described basic menu and the like. A display control unit 1041 is employed so as to display-process the menu data and the like and manage the processed menu data when the menu data are displayed on the display 1042.

Figure 7:
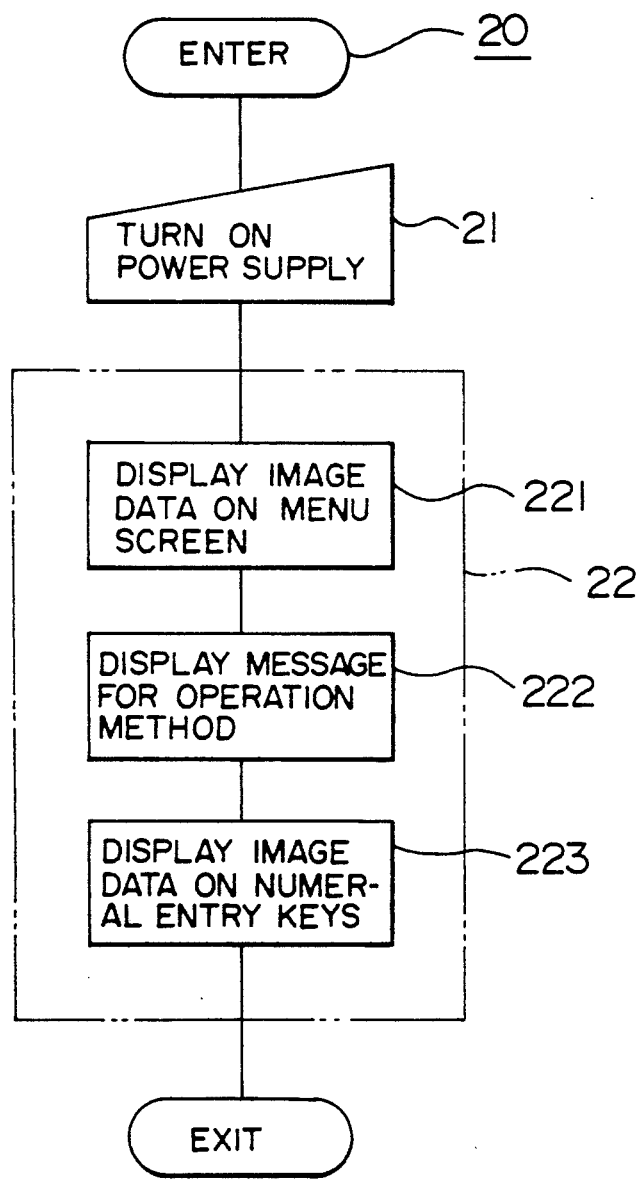
FIG. 7 is a flow chart for explaining an operation of the document processing apparatus shown in FIG. 6.
Figure 8:
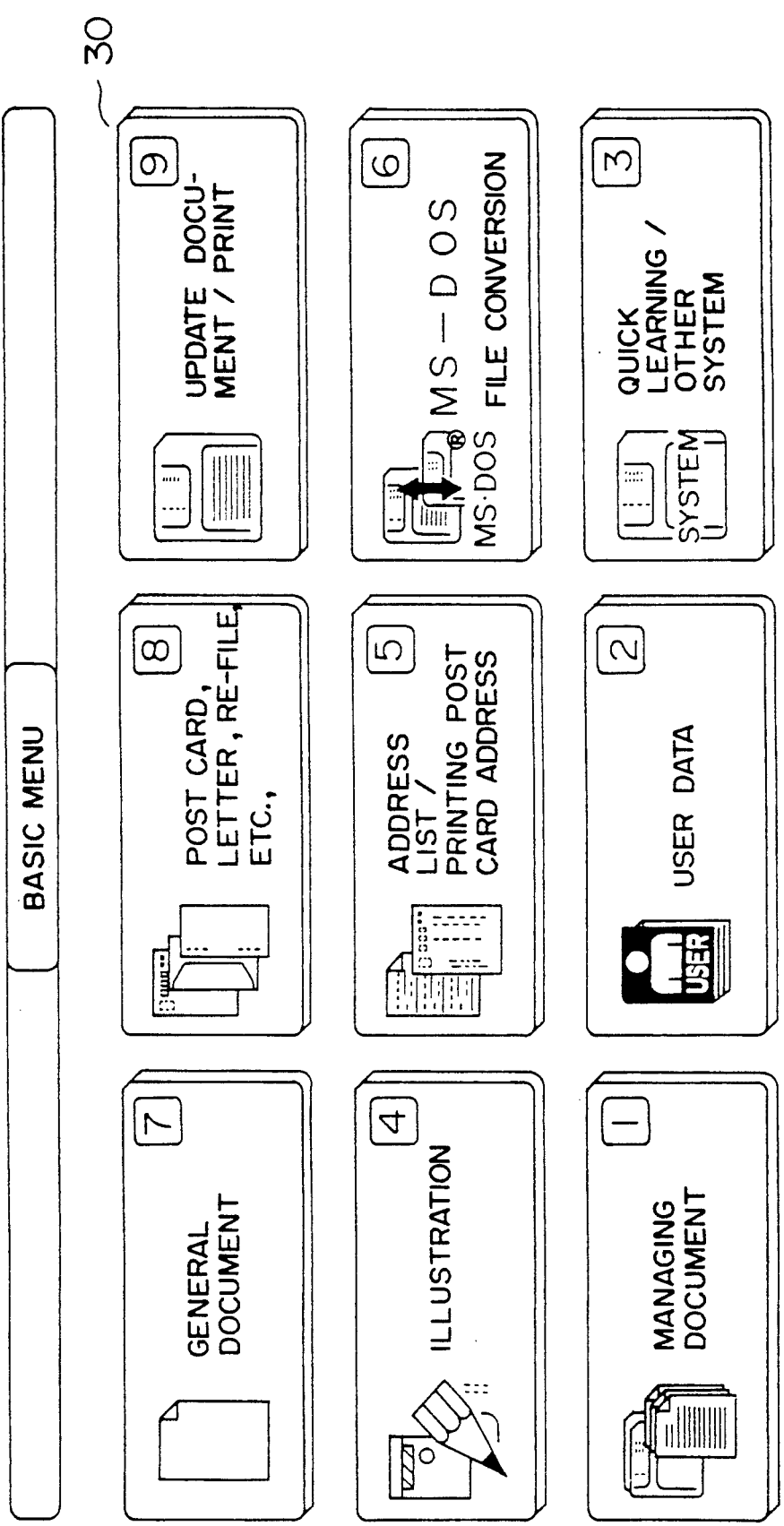
FIGS. 8 and 9 represent display forms of a basic menu.
Figure 9:
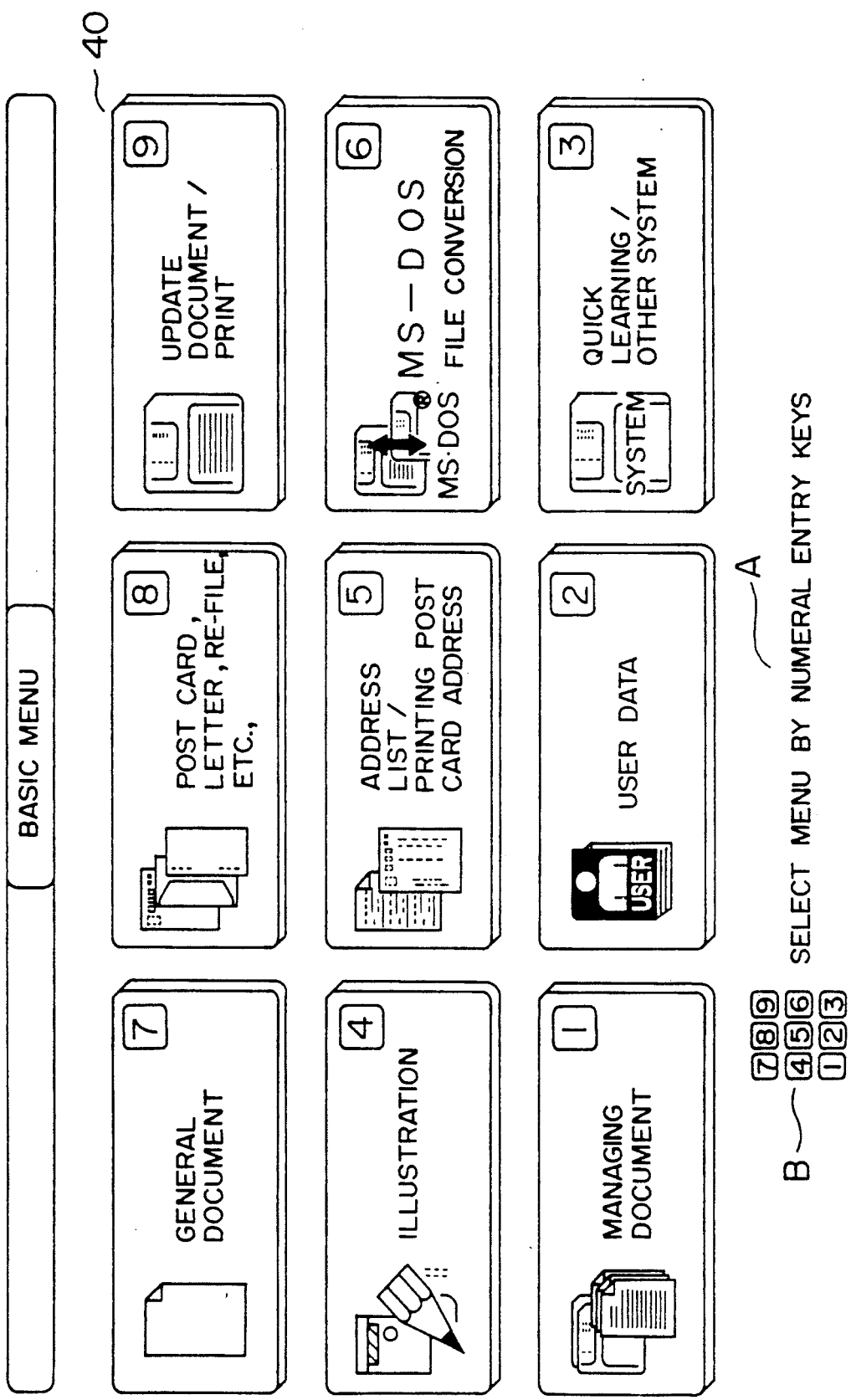

FIG. 7 is a flow chart for representing a process routine 20 to display both the basic menu data and the image data on the numeral entry keys. Referring now to FIG. 7, an operation of this process routine 20 will be described. At a first step 21, when an operator of this document processing apparatus turns on the power supply, the menu data stored in the menu data memory 1033 is read out at step 221, and based on this menu data, the basic menu constructed of a plurality of menu items as shown in FIG. 8 is displayed in a matrix 3×3 arrangement on the display 1042 of the input device 104. This basic menu is arranged by characters of explanation statement of the menu such as a "general document" and a "post card" as shown in FIG. 8, and a drawing for representing these characters, and also numerals corresponding to the arrangement of the numeral entry keys. Then, at step 222, as shown in FIG. 9, for instance, under the basic menu, such a message is displayed that a selection is required for one desirable menu item among the menu items of the above-described basic menu by way of the numeral entry keys. For example, a message "select menu by numeral entry keys" is displayed and then at a step 223, the image data for the numeral entry keys which has been stored in the image data memory 1034 for the numeral entry keys, is read out and displayed alongside this message.

As previously described, when the basic menu is displayed on the display, the basic menu constructed of a plurality of menu items is displayed in a 3×3 matrix form in accordance with the arrangement of the numeral entry keys, and also the drawings indicative of the numeral entry keys are displayed on the same display, so that even when a user may not understand the meaning of the numeral entry keys, they can easily understand that this corresponds to the numeral entry key mounted on the keyboard by observing such a drawing of the numeral entry keys. Then, it is possible to eliminate their hesitation to select the menu and therefore they can simply proceed with the next operation. This is a particular advantage that the numbers of the numeral entry keys are attached to the respective basic menu items for display purposes.

Figure 10:
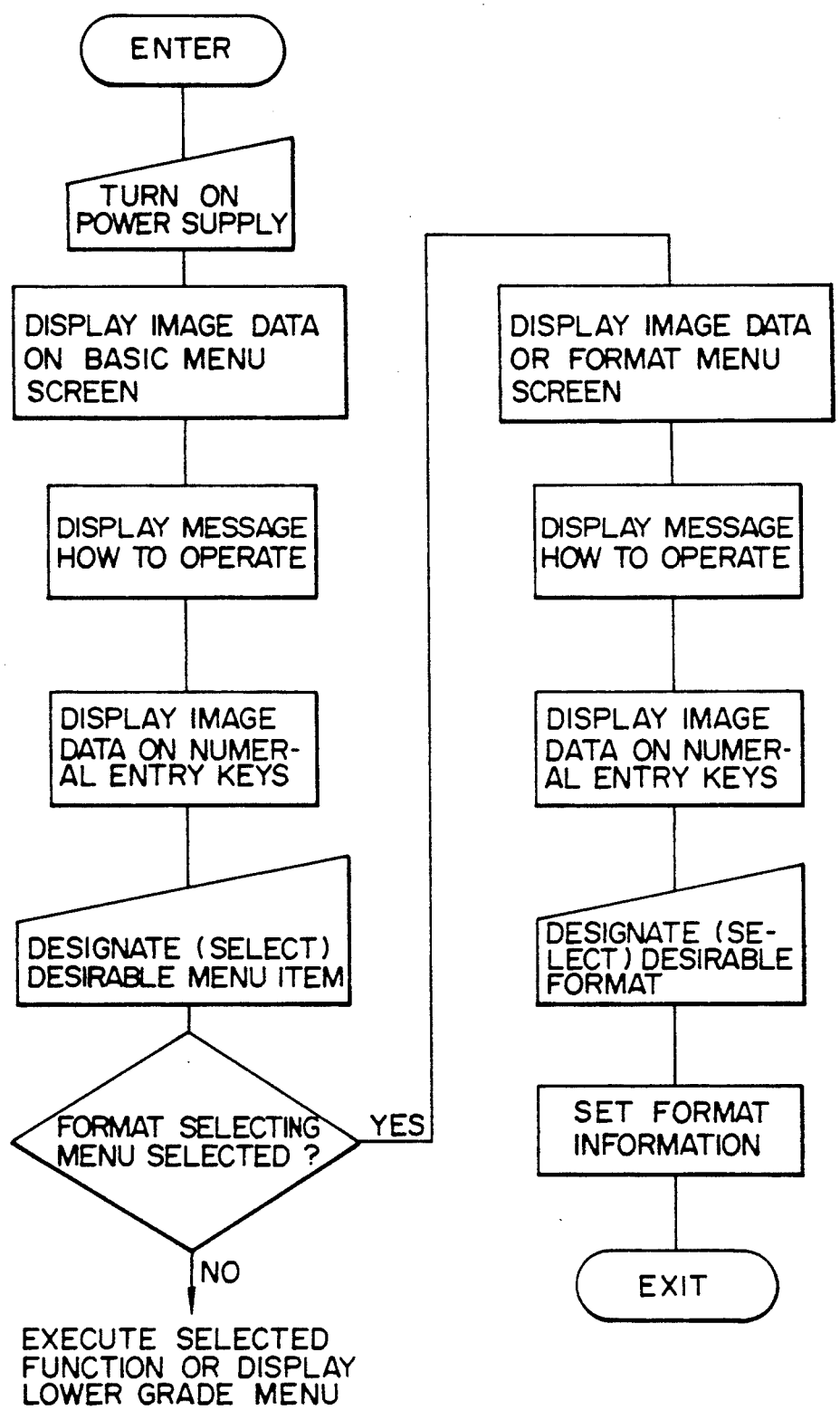
FIG. 10 is a flow chart for showing an operation of a document processing apparatus according to a further preferred embodiment of the present invention.

FIG. 10 is a flow chart for representing an operation of a document processing apparatus according to a further preferred embodiment of the present invention. In this drawing, when a power supply is turned on, a basic menu as shown in FIG. 9 is displayed. The basic menu is arranged by a format selecting menu such as a "general document" and "post card/letter/refile", and also a menu item for immediately executing the function after selecting "update document/print" and for displaying another lower menu such as an "illustration".

While displaying the above-described basic menu, in order to guide users how to operate the data processing apparatus, not only the menu item but also the message for indicating the operation method under the screen are displayed thereon, and furthermore the image data on the numeral entry is displayed.

Subsequently, when a designation is made of the desired menu item among the menu items of the basic menu, the menu item is judged so as to allocate the proper process.

In case that the above-described menu item corresponds to the above-described format selecting menu, the format menu corresponding to the selected item is displayed. This format menu is displayed in a 3×3 matrix form in such a manner that predetermined plural format selecting menu items are displayed similar to the basic menu; not only the menu items but also the message indicative of the operating method are displayed at a lower portion of the display screen in order to guide the user how to operate the document processing apparatus; and furthermore the image data on the numeral entry keys is displayed. When a designation is made of the desirable menu item among the format menu items, the format corresponding to the selected menu item is set and the process is advanced to the editing screen.

On the other hand, if the selected basic menu is not equal to the format selecting menu item, just after the selection of "updata document/print" is made, the function is executed and a lower grade menu such as "illustration" is displayed.

In accordance with the above-described preferred embodiment, there are such particular features that not only the format selection but also other function selection may be performed by the basic menu.

What is claimed is:

1. A document format setting apparatus for setting a format of a document, comprising:
   memory means for storing usage and purpose information of said document and format setting information of said document;
   categorizing means for receiving said usage and purpose information of said document and properly categorizing said document information into a menu of document items;
   display means for displaying said menu of document items;
   selecting means for selecting, from said memory, a menu of format setting items corresponding to a designated document item, said selected menu of format setting items being displayed by said display menus;
   said selecting means further selecting a designated format setting item from said menu of format setting items; and
   format operating means for formatting said document in accordance with said selected document item; and said selected format setting item;
   wherein said selecting means comprises a numerical entry keyboard formed in a 3×3 matrix arrangement,
   said menu of document items also forming a 3×3 matrix arrangement to correspond with said numerical entry keyboard arrangement,
   each document item comprising a picture character to represent the content of said document item and a corresponding numerical entry key,
   said picture characters and corresponding numerical entry keys, along with a message requesting a user to designate a document item, being displayed by said display means.

2. A method for setting a format of a document for a document inputting apparatus having a memory for storing document and formatting information, a display unit, a numerical keyboard for designating functions, and a processor for retrieving designated information and displaying said information accordingly, said method comprising the steps of:
   activating said document inputting apparatus;
   displaying a menu of document items, said document items comprising a representative character and corresponding numerical key, and being arranged to correspond to said numerical keyboard;
   entering a numerical key corresponding to a designated document item;
   displaying a menu of format setting items corresponding to said designated document item, said menu of format setting items being retrieved from said memory;
   entering a numerical key corresponding to a designated format setting item;
   setting a format for said document in accordance with said designated format setting item.

3. A method for setting a format of a document as claimed in claim 2, wherein said designated format selecting menu item is a free form setting item thereby enabling a user to freely set the format of said document.

* * * * *